Jan. 10, 1950 H. G. BELJERS ET AL 2,494,426

AMPLIFIER WITH NEGATIVE FEEDBACK

Filed July 2, 1946

HUGO GERRIT BELJERS
WILLEM SIX
JAN TE WINKEL
INVENTORS.

BY Fred M Vogel

AGENT.

Patented Jan. 10, 1950

2,494,426

UNITED STATES PATENT OFFICE 2,494,426

AMPLIFIER WITH NEGATIVE FEEDBACK

Hugo Gerrit Beljers, Willem Six, and Jan te Winkel, Eindhoven, Netherlands, assignors to Hartford National Bank and Trust Company, Hartford, Conn., as trustee Application July 2, 1946, Serial No. 680,890
In the Netherlands March 4, 1943

Section 1, Public Law 690, August 8, 1946
Patent expires March 4, 1963

2 Claims. (Cl. 179—171)

This invention relates to an amplifier with negative feedback the amplification of which is variable with frequency. The desired variation of amplification with frequency may be obtained in known manner by including in the negative feedback circuit a network the transmission factor $\beta$ of which in respect of its magnitude exhibits a variability with frequency reciprocal to that of the desired amplification. In fact, for the amplification $\mu'$ of an amplifier with negative feedback there applies the formula $$\mu'=\frac{\mu}{1+\mu\beta}$$

in which $\mu$ represents the amplification without negative feedback which for $\mu\beta \gg 1$ changes to $$\mu'=\frac{1}{\beta}$$

from which it appears that the amplification $\mu$ is reciprocal to the transmission factor $\beta$ of the network in the negative feedback circuit. Consequently, by constituting this network in a suitable manner it is possible to obtain any desired variation of amplification with frequency. However, the network will also produce a phase displacement variable with frequency in the negative feedback circuit and this detrimentally affects the stability of the amplifier, since in defiite frequency ranges the negative feedback changes to positive feedback with the danger involved for self-oscillating of the amplifier.

The present invention purports to provide steps whereby the detrimental influence of the network in the negative feedback circuit upon the phase displacement of the negative feedback voltage is avoided.

According to the invention, this object is achieved by including a network in the output circuit of an amplifying tube of the amplifier, which network is constituted in such manner that the amplification factor $\beta_1$, of the amplifying tube and the network together substantially satisfies the relation $\beta\beta_1$=constant and real.

In order that the invention may be more clearly understood and readily carried into effect, it will now be described more fully by reference to the accompanying drawing.

Figure 1:
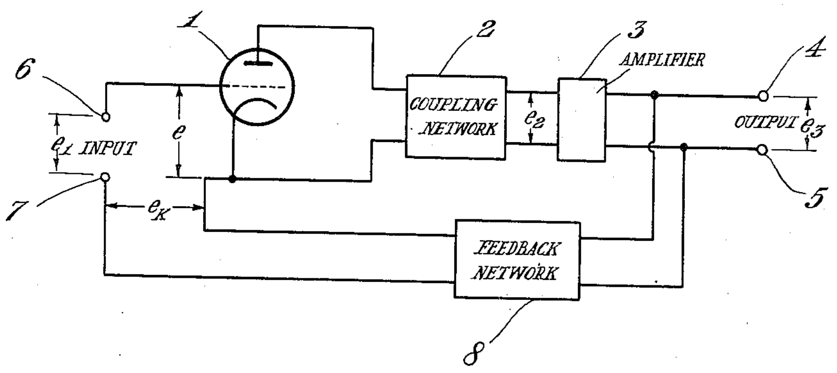

Figure 1 shows a diagram of the principle of an amplifier according to the invention. This amplifier comprises an amplifying tube 1 coupled to output terminals 4, 5 through a network 2 and an amplifier 3. The voltage $e_1$ to be amplified is supplied to input terminals 6, 7. The input circuit has also supplied to it a negative feedback voltage $e_k$ which is derived, through a network

8, from the output terminals of the amplifier between which the output voltage $e_3$ is set up. The amplification factor of the amplifying tube 1 and the network 2 without negative feedback, that is to say the relation which exists between the voltage $e_2$ and the voltage $e$ between the grid and the cathode of the amplifying tube 1 is assumed as $\beta_1$ and the amplification factor of the amplifier 3

$$\frac{e_3}{e_2} \text{ as } \mu$$

Consequently $$e_k=\frac{\mu\beta\beta_1}{1+\mu\beta\beta_1}e_1$$

Now, according to the invention, the networks 2 and 8 are constituted in such manner that $\beta\beta_1=k$=constant and real, so that the abovementioned relation changes to $$e_k=\frac{\mu k}{1+\mu k}e_1$$

from which it follows that the phase displacement of the negative feedback voltage $e_k$ relatively to the input voltage $e_1$ is invariable with the properties of the network 8. It will now always be possible for $\beta\beta_1$ to be made exactly constant. A very small phase displacement is already obtained, if $\beta\beta_1$ is maintained constant as far as possible.

Figure 2:
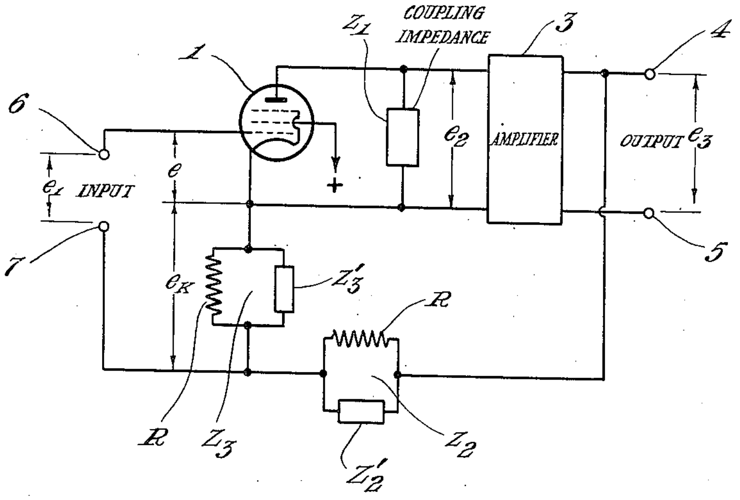

In Figure 2 an impedance $Z_1$ is substituted for the network 2 shown in Figure 1 and an impedance $Z_3$ for the network 8. In series with $Z_3$ is connected, in addition, an impedance $Z_2$. $Z_2$ and $Z_3$ are constituted by impedances $Z_2'$, and $Z_3'$, respectively, which are shunted by a resistance R.

For the negative feedback voltage $e_k$ applies, as before, $$e_k=\frac{\mu\beta\beta_1}{1+\mu\beta\beta_1}e_1$$

With $$\beta_1=\frac{e^2}{e}=SZ_1$$

wherein S represents the mutual conductance of the amplifying tube and wherein it is assumed that the internal resistance is high relatively to $Z_1$ and $$\beta=\frac{Z_3}{Z_2+Z_3}$$

this expression may read:

$$e_k=\frac{\mu S\frac{Z_1Z_3}{Z_2+Z_3}}{1+\mu S\frac{Z_1Z_3}{Z_2+Z_3}}e_1$$

As before, between $e_k$ and $e_1$ there exists a phase relation independent on the network in the negative feedback circuit, if the product $\beta\beta_1$ is constant. Since $$\beta\beta_1=S\frac{Z_1Z_3}{Z_2+Z_3}$$

this will be the case if $$Z_1Z_3=\text{constant}$$
$$Z_2+Z_3=\text{constant}$$

$Z_1Z_3$=constant implies that the impedances $Z_1$ and $Z_3$ must be inverse.

The second condition $Z_2+Z_3$=constant may be fulfilled by constituting $Z_2$ and $Z_3$ in the manner shown in Figure 2, thus satisfying the condition $Z_2'.Z_3'=R^2$. In fact, $$Z_2+Z_3=\frac{Z_2'R}{Z_2'+R}+\frac{Z_3'R}{Z_3+R}=\frac{2Z_2'Z_3'R+(Z_2'+Z_3')R^2}{Z_2'Z_3'+(Z_2'+Z_3')R+R^2}=R$$

It will not always be possible to fulfill exactly the condition $Z_1Z_3$, since $Z_3$ comprises the parallel resistance R, which makes it necessary for $Z_1$ to comprise a series-resistance. Now, $Z_1$ comprises also the capacity which exists between the anode and the cathode of the amplifying tube 1 and with this no resistance can be connected in series. However, the phase displacement resulting from this inaccuracy is small. The condition $Z_2+Z_3$=constant may alternatively be satisfied by replacing $Z_2$ by a resistance R' which is high relatively to the impedance $Z_3$. In this case the resistance R parallel to $Z_3'$ may be omitted.

What we claim is:

1. An amplifying system for electrical oscillations comprising a first amplifying stage including an electron discharge tube provided with a cathode, a grid and an anode and an output impedance $Z_1$ connected between said anode and cathode and having a value which is low relative to the internal resistance of said tube, a second amplifying stage whose input is connected across said output impedance of said first stage, and a negative feedback network having a transmission factor variable with frequency, said network including a first negative feedback impedance $Z_2$ connected across the output of said second stage and a second negative feedback impedance $Z_3$ interposed in series between the output of said second stage and said first feedback impedance, and means to apply said electrical oscillations in series with the feedback wave developed across said first feedback impedance as an input to the grid of said tube, said impedances having respective values substantially satisfying the relations $Z_1Z_3$=constant, and $Z_2+Z_3$=constant.

2. An arrangement as set forth in claim 1 wherein impedance $Z_2$ is constituted by the parallel connection of an impedance having a value $Z_2'$ and a first resistance having a value R, and wherein impedance $Z_3$ is constituted by an impedance having a value $Z_3'$ and a second resistance also having a value R, the respective values of impedances $Z_2'$ and $Z_3'$ substantially satisfying the relation $Z_2'Z_3'=R^2$.

HUGO GERRIT BELJERS.
WILLEM SIX.
JAN TE WINKEL.

REFERENCES CITED

The following references are of record in the file of this patent:

UNITED STATES PATENTS

| Number | Name | Date |
|---|---|---|
| 2,196,844 | West | Apr. 9, 1940 |

FOREIGN PATENTS

| Number | Country | Date |
|---|---|---|
| 484,332 | Great Britain | Nov. 19, 1937 |